J. VAN HOUTEN.

Grain Separator.

No. 1,657.

Reissued April 19, 1864.

WITNESSES:

Geo. S. Jordan

R. W. Smith

INVENTOR.

J. Van Houten

By Wm. S. Coughlborough his Atty

N. PETERS, Photo-Lithographer, Washington, D. C.

UNITED STATES PATENT OFFICE.

JOSEPH VAN HOUTEN, OF MOUNT MORRIS, NEW YORK.

IMPROVEMENT IN GRAIN-SEPARATORS.

Specification forming part of Letters Patent No. 41,032, dated December 22, 1863; Reissue No. 1,657, dated April 19, 1864.

*To all whom it may concern:*

Be it known that I, JOSEPH VAN HOUTEN, of Mount Morris, in the county of Livingston and State of New York, have invented certain new and useful Improvements in Grain-Separators; and I do hereby declare that the following is a full, clear, and exact description thereof, reference being had to the accompanying drawings, making a part of this specification, in which—

Figure 1:
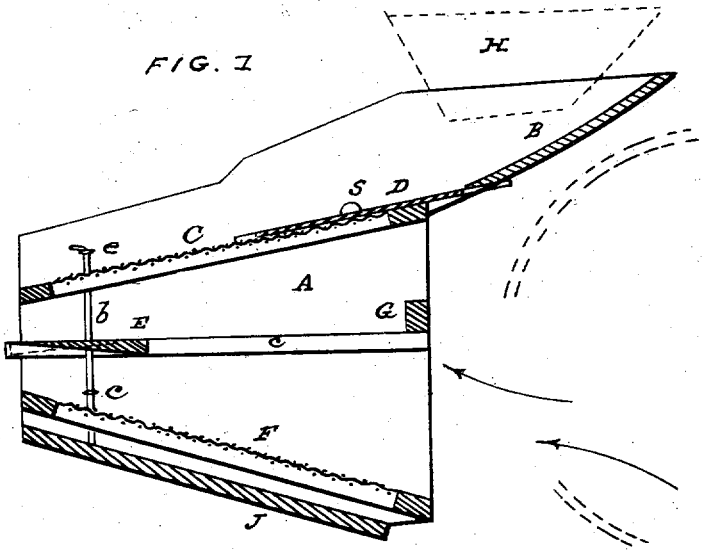
Figure 2:
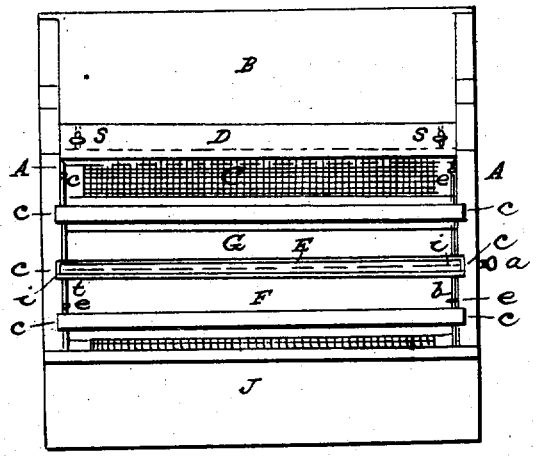

Figure 1 is a vertical longitudinal section of the shoe of an ordinary fanning-mill with my improvements attached. Fig. 2 is a view of the rear end of the same.

Similar letters of reference indicate corresponding parts in both figures.

This invention relates to that class of improvements which are more especially designed for separating oats and chess from wheat and barley; and it consists in providing the upper or wheat sieve of any ordinary fanning-mill with an adjustable board, which may be set so as to convey the grain farther down, or not so far—as circumstances may require—before it is allowed to pass through, such changes being necessary for heavy or light grain; and also in providing a division-board that may be adjusted longitudinally in the shoe, and that may be inclined or declined toward the tail of the mill, so as to cut off all the oats or chess which may work through the lower end of the upper sieve and discharge them from the shoe, thus preventing such grain from encumbering or reaching the cockle-screen at all.

To enable others to make and use my invention, I will proceed to describe its construction and operation.

A in the drawings represents the sides of the shoe of ordinary fanning-mills, and they are connected by the bottom J, girt G, and curved chute-board B. The dotted lines H, Fig. 1, represent the feed-hopper, the curved dotted lines the drum of the fan, and the arrows the direction of the blast. The gains *c* in the sides A are provided for the reception of the sieves and screens, which are held in place by the rods *b*, passing through their frames, and the staples *e*.

In applying this invention the sieve C and screen F are used as provided in the ordinary fanning-mills, and in the same adjustment. The zinc plate D is made to fit loosely between the sides A, and nearly or quite wide enough to reach from the lower edge of the board B to the center of the sieve C, and the set-screws S pass through a slot in each end, thus securing it to the sieve-frame. The slots allow the plate, by loosening the set-scews S, to be moved up or down, so as to cover more or less of the area of the sieve C, as may be required.

The division-board or plate E may be made one-third, more or less, as wide as the length of the upper sieve, and may be faced with a zinc plate. Each end is provided with several holes for the rods *b* to pass through. The front edge of the board E may be thick enough to fill the gains *c*; but it should be tapered, as seen in Fig. 1, so that when the rear end of the shoe is raised or lowered the rear edge of the board may be moved down or up, and thereby be made to retain a horizontal position, or even, if necessary, to clear itself freely it may be made to decline toward the rear of the shoe, the position of the latter never being sufficiently changed vertically to prevent it. There may be a wedge, *i*, put in the gain at each end of the board to keep it in the desired position, or a set-screw through the side of the shoe may be used, as seen at *a*, Fig. 2.

Operation: The plate D should be set far enough down to cause the small oats and chess that work through the sieve, soon after being exposed to its surface, to be caught by the division-board E and discharged from the shoe, thus completing the operation at that point, whereby the ordinary sceen F may be retained without change in its construction or adjustment, and thus the cockle and other small seeds may be screened from the wheat or barley during the process of separating the oats and chess. If the oats to be separated are very light, the throat-space between the lower edge of the plate D and front edge of the board E may be increased by sliding the plate up and moving the board farther back, which latter may be done by removing the rods *b*.

The blast should be very steady and the shake of the shoe very light and easy when these improvements are used.

What I claim as my invention, and desire to secure by Letters Patent of the United States, is—

1. Providing the upper end of wheat-sieves C with an adjustable plate or covering, D, substantially in the manner and for the purposes set forth.

2. So constructing and arranging the adjustable division-plate E that one edge may be raised or lowered within the groove *c*, substantially as described, and for the purposes set forth.

JOSEPH VAN HOUTEN.

Witnesses:
WM. S. LOUGHBOROUGH,
A. H. BILLINGS.